US007886336B2

(12) United States Patent
Schuster et al.

(10) Patent No.: US 7,886,336 B2
(45) Date of Patent: Feb. 8, 2011

(54) METHOD OF INITIATING A SECURITY PROCEDURE WITHIN A BUILDING

(75) Inventors: Kilian Schuster, Ballwil (CH); Paul Friedli, Remetschwil (CH)

(73) Assignee: Inventio AG, Hergiswil NW (CH)

( * ) Notice: Subject to any disclaimer, the term of this patent is extended or adjusted under 35 U.S.C. 154(b) by 1084 days.

(21) Appl. No.: 09/855,000

(22) Filed: May 14, 2001

(65) Prior Publication Data

US 2002/0057188 A1 May 16, 2002

(30) Foreign Application Priority Data

May 25, 2000 (EP) ................................ 00810454

(51) Int. Cl.
*H04L 9/00* (2006.01)

(52) U.S. Cl. ........................................................ 726/2

(58) Field of Classification Search ......... 380/227–279, 380/284, 286, 281, 43; 713/150, 153, 156–159, 713/171–176, 179, 182–186, 200–201; 709/201, 709/217, 219, 223–225; 705/71, 78; 726/1–7, 726/9, 10, 15, 17–19, 27–30

See application file for complete search history.

(56) References Cited

U.S. PATENT DOCUMENTS

| | | | | |
|---|---|---|---|---|
| 4,023,139 | A | 5/1977 | Samburg | |
| 4,808,803 | A * | 2/1989 | Magier et al. | 235/382 |
| 4,880,237 | A | 11/1989 | Kishishita | |
| 4,937,855 | A * | 6/1990 | McNab et al. | 379/102.06 |
| 5,546,463 | A * | 8/1996 | Caputo et al. | 713/159 |
| 5,768,379 | A | 6/1998 | Girault et al. | |
| 5,796,827 | A * | 8/1998 | Coppersmith et al. | 713/182 |
| 5,900,019 | A * | 5/1999 | Greenstein et al. | 711/164 |
| 5,900,024 | A * | 5/1999 | Morearty | 712/225 |
| 5,903,878 | A * | 5/1999 | Talati et al. | 705/26 |
| 5,977,872 | A * | 11/1999 | Guertin | 340/515 |
| 6,000,505 | A * | 12/1999 | Allen | 187/391 |
| 6,069,628 | A * | 5/2000 | Farry et al. | 715/835 |
| 6,100,885 | A * | 8/2000 | Donnelly et al. | 715/762 |
| 6,157,649 | A * | 12/2000 | Peirce et al. | 370/401 |
| 6,175,831 | B1 * | 1/2001 | Weinreich et al. | 707/10 |
| 6,195,648 | B1 * | 2/2001 | Simon et al. | 705/40 |

(Continued)

FOREIGN PATENT DOCUMENTS

AR 001065 A1 1/1996

(Continued)

OTHER PUBLICATIONS

Microsoft Computer Dictionary, Microsoft Press, 5th Edition, pp. 59-60, 192, 480, 572.*

*Primary Examiner*—Kimyen Vu
*Assistant Examiner*—Leynna T Truvan
(74) *Attorney, Agent, or Firm*—Fraser Clemens Martin & Miller LLC; William J. Clemens

(57) ABSTRACT

A method for initiating a security procedure within a building whereby a virtual key is generated by a certain event and transmitted to a selected person. If the selected person identifies himself by means of the virtual key, a security procedure, for example making an elevator available, is initiated within the building.

5 Claims, 1 Drawing Sheet

U.S. PATENT DOCUMENTS

| | | | | |
|---|---|---|---|---|
| 6,212,636 | B1 * | 4/2001 | Boyle et al. | 713/168 |
| 6,219,421 | B1 * | 4/2001 | Backal | 380/28 |
| 6,259,805 | B1 * | 7/2001 | Freedman et al. | 382/124 |
| 6,282,553 | B1 * | 8/2001 | Flickner et al. | 708/141 |
| 6,301,339 | B1 * | 10/2001 | Staples et al. | 379/93.01 |
| 6,331,865 | B1 * | 12/2001 | Sachs et al. | 715/776 |
| 6,343,361 | B1 * | 1/2002 | Nendell et al. | 713/171 |
| 6,421,453 | B1 * | 7/2002 | Kanevsky et al. | 382/115 |
| 6,477,434 | B1 * | 11/2002 | Wewalaarachchi et al. | 700/83 |
| 6,490,443 | B1 * | 12/2002 | Freeny, Jr. | 455/406 |
| 6,581,042 | B2 * | 6/2003 | Pare et al. | 705/40 |
| 6,615,775 | B2 * | 9/2003 | Takemura et al. | 123/90.15 |
| 6,668,321 | B2 * | 12/2003 | Nendell et al. | 713/169 |
| 6,715,073 | B1 * | 3/2004 | An et al. | 713/156 |
| 6,724,875 | B1 * | 4/2004 | Adams et al. | 379/201.01 |
| 6,779,024 | B2 * | 8/2004 | DeLaHuerga | 709/217 |
| 6,889,214 | B1 * | 5/2005 | Pagel et al. | 705/410 |
| 6,892,300 | B2 * | 5/2005 | Carroll et al. | 713/156 |
| 6,898,299 | B1 * | 5/2005 | Brooks | 382/115 |
| 6,903,681 | B2 * | 6/2005 | Faris et al. | 342/357.06 |
| 6,920,496 | B2 * | 7/2005 | Clarke | 709/225 |
| 6,980,672 | B2 * | 12/2005 | Saito et al. | 382/124 |
| 6,999,936 | B2 * | 2/2006 | Sehr | 705/5 |
| 7,111,173 | B1 * | 9/2006 | Scheidt | 713/186 |
| 7,117,529 | B1 * | 10/2006 | O'Donnell et al. | 726/6 |
| 7,158,941 | B1 * | 1/2007 | Thompson | 705/8 |
| 7,188,251 | B1 * | 3/2007 | Slaughter et al. | 713/182 |
| 7,197,638 | B1 * | 3/2007 | Grawrock et al. | 713/165 |
| 7,260,726 | B1 * | 8/2007 | Doe et al. | 713/189 |

FOREIGN PATENT DOCUMENTS

| | | | |
|---|---|---|---|
| AR | 037804 | A1 | 12/2004 |
| EP | 0232240 | | 8/1987 |
| EP | 0 924 657 | | 6/1999 |
| EP | 0924657 | | 6/1999 |
| GB | 2 104 696 | | 3/1983 |

* cited by examiner

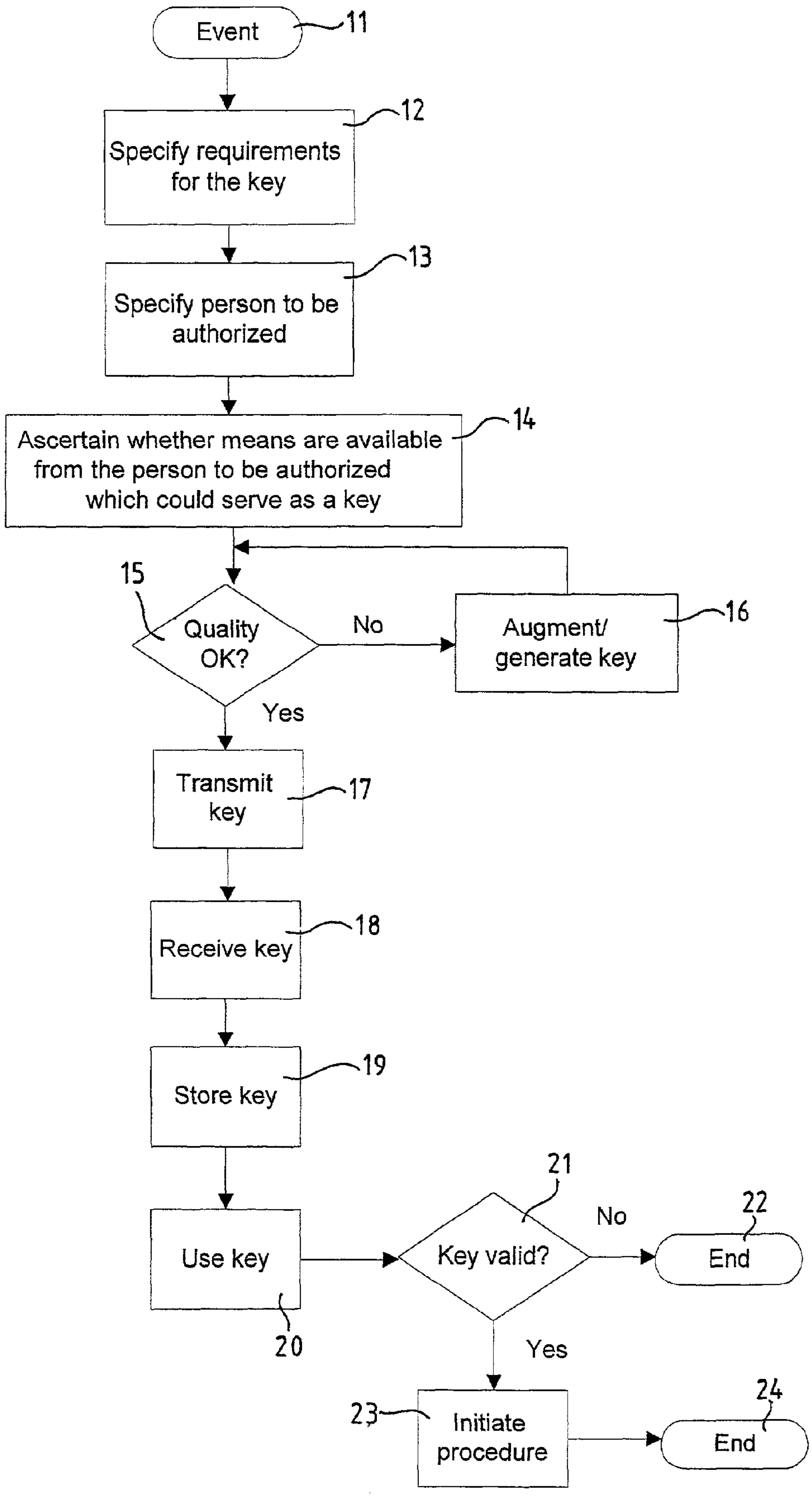
Event
11
Specify requirements for the key
12
Specify person to be authorized
13
Ascertain whether means are available from the person to be authorized which could serve as a key
14
15
Quality OK?
No
Augment/ generate key
16
Yes
Transmit key
17
Receive key
18
Store key
19
Use key
20
21
Key valid?
No
22
End
Yes
23
Initiate procedure
24
End

METHOD OF INITIATING A SECURITY PROCEDURE WITHIN A BUILDING

BACKGROUND OF THE INVENTION

The present invention relates to a method of initiating a security procedure within a building controlling access to restricted areas.

Modem buildings, especially complex buildings, today have a comprehensive infrastructure such as, for example, doors in the entrance area and if necessary, on each floor, with electronic access control, turnstiles with electronic access control, and elevator installations which are also equipped with access monitoring.

If a person in this building suddenly needs the urgent assistance of a physician, a sequence of procedures must be performed without hindrances occurring. Firstly, the person who needs assistance must communicate to another person that he/she needs assistance and to what extent. This other person must then inform the emergency physician and ensure that the building personnel know of the emergency physician's visit, receive the emergency physician, allow him/her through the safety barriers in the building, and guide the emergency physician to the respective floor and into the respective room in the building where the person requiring assistance is located. As well as this, the building personnel must be comprehensively and correctly informed and instructed. Inadvertently incorrect information can have fatal consequences. Furthermore, the emergency physician must be able to reach the person requiring assistance as quickly as possible. This requires a high administrative outlay, and the personnel must be comprehensively trained.

A further case can be that an order is placed by a person working in the building, or a resident of the building. For some reason or other, however, this person or the resident cannot take delivery of the goods or services themselves. The person or resident must therefore actively arrange that the goods or service which have been ordered can also be received. As a rule, this can be done by the person or resident instructing another person, who then takes on this task for them. If no such person is available, or if there is a misunderstanding, the ordered goods or service cannot be received, which can again have corresponding consequences.

If a building cleaning service has to clean and care for certain parts of the building at certain times, the cleaning personnel must be given corresponding rights of entry. This is generally done by handing to the cleaning personnel one or more mechanical keys which are not able to unlock certain doors. When this is done, there is no guarantee that the person who has possession of this key is also a member of the cleaning personnel. There is a further problem in that if the key is lost, substantial damage can occur. In this situation misuse cannot be ruled out.

If a resident of the building expects several guests, he must provide each individual visitor who reports to reception with access to the building and if necessary, each time anew give a description of the way to find him in the building. Under certain circumstances this can be quite tedious.

If in the building or in an apartment of the building a one-time or rarely repeating service is performed, authorization of access for the service personnel can only be arranged with high administrative outlay. Either a person must accompany the service personnel, or a mechanical key must be made available for the service personnel, which requires a certain amount of trust in advance and increases the danger of misuse.

SUMMARY OF THE INVENTION

An objective of the present invention is therefore to specify a method of initiating a procedure within a building by means of which certain components of the infrastructure of the building can be automatically and faultlessly made available to an authorized person in a safe manner. With the method according to the present invention for initiating a procedure in a building, a virtual key is generated by a certain event. The virtual key is then communicated to a person. If the authorized person identifies himself by means of the key, the procedure is initiated in the building.

It is advantageous for the key to be assigned a certain code by means of an encryption method.

Furthermore, it is an advantage to add to the key a signature with which the recipient of the key can identify himself to third parties as the person authorized to use it.

It is also an advantage for the type of procedure to be made dependent on the type of event.

It is advantageous for the procedure to control an elevator situated in a building.

Another advantageous further development of the present invention is that the person to whom the key is communicated is made to depend on the type of event.

Moreover, it can be checked whether for the person to whom the key is communicated a key already exists and if so, whether it is being used with modification.

A further advantage of the invention is that the means which the person to be authorized has available to identify himself are ascertained, and a suitable one of them is selected.

In a further embodiment of the invention, if a key already exists, it is checked whether this fulfils the security requirements and if necessary, a new or augmented key is generated.

It is advantageous for the person to identify himself when receiving the key.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a flowchart for the method according to the present invention of initiating a security procedure within a building.

DESCRIPTION OF THE PREFERRED EMBODIMENT

As shown in FIG. 1, the initiating element is a certain event identified as a starting point "Event" 11. As already mentioned above, the event can be an emergency call, an order, a request such as for a cleaning service, an invitation, or a periodically recurring event such as, for example, monitoring a condition, or a service.

The type of event determines what requirements are specified for a key that is to be generated. For example, if a fire occurs in the building, the requirements for the security of the key must be set less high and the requirements for the availability of the key must be set higher. If, however, the initiating event is giving to a cleaning service the task of cleaning the building, the security requirements for the key to be issued must be set significantly higher. This means that in this case, the danger of misusing the key must be kept as low as possible, whereas in case of fire, access to the building must be guaranteed under all circumstances. In consequence, different types of events place different requirements on the key to be issued in a processing step "Specify Requirements for the Key" 12.

The term key or virtual key as used herein is to be understood as a code.

It is also through the event that the person to be authorized is defined. If, for example, the initiating event is an emergency call, for this event the emergency physician must be called, whereas if the initiating event is a personal invitation of a resident of the building, the guest or guests must be invited. The person is defined in a processing step "Specify Person to be Authorized" 13.

Whether the requirements for the key are defined first, and then those for the persons(s) to be authorized, depends on the circumstances describing the system. Thus, the order of steps 12 and 13 can be reversed.

After this, it must be ascertained whether means are available from the person to be authorized which can be used as a key. Examples of possible means are communication means such as a telephone, mobile radio, pager, or PC. The means are ascertained in a step "Ascertain Whether Means are Available from the Person to be Authorized Which Could Serve as a Key" 14.

Examples of possible means for a key are a secret word, a secret number, a sentence, a symbol, or a picture.

After the requirements for the key have been defined, and the person who is to be authorized has been defined, and it has been ascertained whether means are available from the person to be authorized which can be used as the key, it is checked whether the quality of a key which may be present fulfils the requirements at a decision point "Quality OK?" 15. If this is not the case, the method branches at "No" to a processing step 16 wherein a new key is generated, or else the key which is present is augmented to the extent necessary to fulfill the requirements for the key.

After a suitable key has been generated, or the initial quality of the key was acceptable, the method branches from the step 15 at "Yes" to a processing step "Transmit Key" 17 where the key is communicated to the authorized person. The type of transmission depends on the means available to the authorized person. If the authorized person has a mobile radio telephone, the transmission can take place over an interface of air. However, if the key must be transmitted to a fax device, wired transmission is generally used. The type of communication of the key depends on the technical circumstances.

If necessary, identification of the authorized person can already take place when the key is received. This can be done, for example, with biometric characteristics such as the voice of the recipient, or his fingerprint. After the key has been received in a method step "Receive Key" 18 and, if necessary, the person authorized to use it has identified himself, the key is stored in a method step "Store Key" 19 on the means of transmission available to the authorized person. However, this is not absolutely essential. The person authorized to use the key can remember it himself.

As soon as the person authorized to use the key arrives at the respective building, the key comes into use in a method step 20. Depending on the key, use of the key takes place by entering the secret number, the secret word, or similar on a keyboard, or detection of the key in spoken form by a microphone on the building, or the biometrics features of the person authorized to use the key by a corresponding biometrics sensor arranged on the building.

After the key has been entered, a check is made of the key for validity at a decision point "Key Valid?" 21. If the key is recognized to be invalid, for example if the key can only be used for a specified period of time and is used later than this, it is rejected by branching at "No" and terminating the process at an end point "End" 22. The person does not obtain access to the building, the procedure is not initiated.

On the other hand, if the key is recognized as valid, the process branches at "Yes" to a process step "Initiate Procedure" 23 wherein the procedure is initiated, for example the doors of the building are opened, the elevator is made available, the elevator doors opened, and any security barriers which may be present are released. A further procedure can be transmission of a message to the sender of the key. Further, the user of the key can be given information about the way to get to the person who sent the key. A greeting to the person authorized to use the key, or other items of information left for the authorized user, can now be delivered. The initiated procedure can also include an automatic trip of the elevator to the destination floor. Finally, the procedure can also be 3 o a receipt for delivery of the goods or service. Upon completion of the procedure, the process terminates at an end point "End" 24.

By means of the method according to the present invention, an electronic key for granting access to certain areas as a result of external events, for example an order by mail, a request for help, detection of fire, and so on is automatically generated and delivered. This means that the initiating event automatically implies the requirement for access, and that the necessary steps (provision and dispatching of the key) are taken. For example, a request for an emergency physician by means of an emergency transmitter causes a code to be delivered to the physician. With this, the physician identifies himself to the access control system, so as to be able to reach the patient unhindered.

The electronic key can, for example, be implemented in the form of a binarily represented number or sequence of numbers. The relevant persons involved in generating the key, and in distributing and using the key, are the ordering person (for example the person to be visited), the visitor, and an administrator. When doing so, various forms and methods of identification and authentication are possible such as those provided by public key cryptography. In this connection, reference should be made to the publication of R. L. Rivest, A. Schamir, and L. Adleman "A Method for Obtaining Digital Signatures and Public-key Cryptosystems", 1977. In that work, a coding method is described with which an encryption key is publicly accessible without the decryption key being made publicly accessible. The method is also known as the RSA method.

In a simple embodiment of the key, the key can be augmented with a PIN code, an identifier, a telephone number, or a secret word. Greater protection against misuse can be obtained by using a public key as authentication, and corresponding encryption methods for communication. When doing so, in a first phase public keys based on authentication are used. If a user is to be granted access or other rights, he receives these rights securely sent to him in numerical form and by means of the public key. When using the rights, decryption takes place which ensures that the declared rights as, for example, of access are granted by an authorized source. Furthermore, a method of signing can be added which enables corresponding proof to third parties.

The key can contain various items of information. It is possible that a part of the key is a signature of the recipient or the administrator. A further part of the key can be the initiating event itself. It is even possible to add items of information to the key which contain, for example, the access rights, i.e. who may have access to where, and when. Further, the type of right can be documented in the key. Finally, it is also possible to store in the key only a reference or a pointer that indicates the address in storage under which the administrator has stored the additional information.

Depending on the specific application, the key can be stored completely or partially in one or more places. If the key is stored completely in several places this means high redundancy and therefore high certainty of access, but also a high danger of misuse. Storing the key in its complete form in several places can be helpful, for example in case of fire in the building.

The items of information stored in the key can be transmitted to the building's own receiver via, for example, an infrared interface (IRDA) or a Bluetooth radio interface of a mobile radio telephone.

IRDA (Infrared Data Association) defines an infrared communication standard. It can be used to create wireless connections with a range of between 0 and 1 meter and a data transmission rate of between 9600 and 16 Mbaud.

Bluetooth is intended for short-range voice and data traffic at radio frequencies of 2.4 GHz in the ISM band. Its range lies between 10 cm and 10 m but can be extended up to 100 m by increasing the transmission power.

Generation and distribution of the key can also be performed by different sources such as, for example, an alarm trigger, the building administrator, or a third source. Generation of the key is automatically based on an indication such as that given by triggering of an alarm.

With receipt of the key, other items of information and instructions can be transmitted such as, for example, a sketch showing the way, a restriction on visiting times, or operating instructions.

When the key is used it is possible, for example, for the purpose of informing or authenticating the user, to create a communication connection between the key transmitter and the key bearer.

Furthermore, it is possible to inform the sender of the key if the key has not been used after expiry of a certain period of time. It is also possible to modify the rights granted to the authorized user, so that the authorized user is no longer authorized to use the key, or only with limitations. As well as this, the rights of all keys can be modified. This can be of significance if a number of keys have been distributed, but from now on only some of them may be used.

The sender of the key or the administrator can be notified if the key functions incorrectly and/or there are attempts at manipulation.

The key can be embedded in a higher-level program so that, for example, an operating program can be transmitted together with the key to a mobile telephone with WAP browser. The telephone can then be used as an operating interface inter alia to make use of the key.

Furthermore, it is possible to charge a fee for each use of the key which can depend on the type of key and the action or procedure which is initiated. Charging can be to the key owner, in other words the authorized user, the sender of the key, or someone else.

As well as this, it is possible to use the key to switch to a special operating mode when the key is used. This could be especially important for the fire service in case of fire, so they can control an elevator.

If a key is used, this can be indicated visually and/or acoustically.

If a key is not used, this can cause certain actions to be initiated, such as a reminder message to the recipient of the key.

Further, when the key is used, additional information can be transmitted to the lock, in other words the electronic recipient. The type of information can then be determined by the key itself and/or requested by the lock. The information can contain, for example, details of the visitor such as personnel number, preferred room temperature, or ability to communicate.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of initiating a procedure within a building comprising the steps of:

a. defining at least one initiating event for the procedure which event does not involve a person arriving at the building, and further defining different procedures for different initiating events;

b. defining at least one security requirement for the procedure, and further defining different security requirement for the different procedures;

c. defining at least one person to be authorized to perform the procedure;

d. detecting the occurrence of the at least one initiating event wherein the at least one person does not define the at least one initiating event and does not cause the occurrence of the at least one initiating event;

e. generating a virtual key for the at least one based on the at least one requirement detecting the occurrence of the at least one initiating event and prior to the at least one person arriving at the building, wherein the step of generating the virtual key includes the steps of assigning an encrypted code to the virtual key, and adding a signature to the virtual key;

f. transmitting virtual key to the at least one person using wireless device, and further transmitting different virtual keys to the at least one person for the different initiating events;

g. detecting use of the virtual key by the at least one person in the building;

h. checking the validity of the virtual key, including identifying the at least one person as a recipient of the transmitted virtual key by the signature; and i. initiating said procedure within the building if the validity check is positive wherein initiating the procedure consists of performing at least one of the steps of:

opening of at least one door of the building;

making at least one elevator available;

opening of at least one elevator door; and j. performing said steps a. through i. in an access control computer system associated with the building.

2. The method according to claim 1 further comprising the step of storing the virtual key partially or completely.

3. The method according to claim 1 further comprising the step of identifying the at least one person with biometric characteristics.

4. The method according to claim 1 further comprising performing said step i. as at least one of the steps of:

initiating a control procedure of an elevator in the building;

initiating a medical assistance procedure;

initiating a building cleaning procedure; and initiating a guest reception procedure.

5. A method of initiating a procedure within a building comprising the steps of:

a. defining at least one initiating event for the procedure which event does not involve a person arriving at the building, and further defining different procedures for different initiating events;

b. defining at least one of a security requirement and an availability requirement for the procedure, and further defining different security requirement for the different procedures;

c. defining at least one person to be authorized to perform the procedure;

d. detecting the occurrence of the at least one initiating event wherein the at least one person does not define the at least one initiating event and does not cause the occurrence of the at least one initiating event;

e. generating a virtual key for the at least one based on the at least one requirement detecting the occurrence of the at least one initiating event and prior to the at least one person arriving at the building, wherein the step of generating the virtual key includes the steps of assigning an encrypted code to the virtual key, and adding a signature to the virtual key;

f. transmitting virtual key to the at least one person using wireless devices;

g. detecting use of the virtual key by the at least one person in the building;

h. checking the validity of the virtual key, including identifying the at least one person as a recipient of the transmitted virtual key by the signature;

i. initiating said procedure within the building if the validity check is positive wherein initiating the procedure consists of performing at least one of the steps of:

opening of at least one door of the building;

making at least one elevator available;

opening of at least one elevator door; and j. performing said steps a. through i. in an access control computer system associated with the building.

* * * * *